US 6,713,723 B2

(12) United States Patent
Lee

(10) Patent No.: US 6,713,723 B2
(45) Date of Patent: Mar. 30, 2004

(54) BASIC FLUX CORED WIRE WITH EXCELLENT WELDABILITY

(75) Inventor: Sunil Lee, Changwon (KR)

(73) Assignee: Kiswel Ltd., Changwon (KR)

(*) Notice: Subject to any disclaimer, the term of this patent is extended or adjusted under 35 U.S.C. 154(b) by 23 days.

(21) Appl. No.: 10/235,821

(22) Filed: Sep. 6, 2002

(65) Prior Publication Data

US 2003/0116550 A1 Jun. 26, 2003

(30) Foreign Application Priority Data

Sep. 6, 2001 (KR) .................. 10-2001-0054653

(51) Int. Cl.[7] .............................................. B23K 35/02
(52) U.S. Cl. ................................. 219/145.22; 219/146.24
(58) Field of Search ........................ 219/145.22, 146.1, 219/146.24, 145.1

(56) References Cited

U.S. PATENT DOCUMENTS 5,378,871 A * 1/1995 Nishikawa et al. .... 219/145.22

FOREIGN PATENT DOCUMENTS

| EP | 0 563 866 A1 | 3/1993 | | |
|---|---|---|---|---|
| JP | 58110194 | 12/1981 | | |
| JP | 62-192297 | * 8/1987 | .......... | B23K/35/36 |
| JP | 05329884 | 9/1992 | | |
| JP | 08099192 | 9/1994 | | |

* cited by examiner

*Primary Examiner*—M. Alexandra Elve
(74) *Attorney, Agent, or Firm*—Bacon & Thomas, PLLC

(57) ABSTRACT

Disclosed is a basic flux cored wire having a mild steel or an alloy steel sheath filled with flux, characterized in that the flux essentially consists of, with respect to the total weight of the wire: 0.3 to 3.0% Ti and Ti oxide ($TiO_2$-converted value); 1.0 to 2.5% Si and Si oxide ($SiO_2$-converted value); 0.1 to 1.5% Mg and Mg oxide (MgO-converted value); 1.5 to 4.0% Mn and Mn oxide (MnO-converted value); 0.2 to 1.5% Al and Al oxide ($Al_2O_3$-converted value); 0.1 to 1.0% Zr and Zr oxide ($ZrO_2$-converted value); 0.2 to 3.5% $CaF_2$; and 0.01 to 0.5% $K_2O$, with the proviso that the components satisfy the basicity of 0.5 to 4.5 in the basicity equation (1) defined as $B=(CaF_2+MgO+MnO+K_2O)/(TiO_2+SiO_2+Al_2O_3+ZrO_2)$. The basic flux cored wire of the present invention is excellent in crack resistance and low temperature toughness, and exhibits excellent welding workability in all welding positions, ensuring an improvement in the efficiency of welding work. Furthermore, the basic flux cored wire according to the present invention exhibits excellent welding workability even under a shield gas of 100% $CO_2$.

1 Claim, 1 Drawing Sheet

BASIC FLUX CORED WIRE WITH EXCELLENT WELDABILITY

BACKGROUND OF THE INVENTION

1. Field of the Invention

The present invention relates to a basic flux cored wire with excellent weldability, and more particularly, to a basic flux cored wire, which exhibits excellent crack resistance and low temperature toughness, and is improved in welding workability.

2. Description of the Related Art

Some conventional basic flux cored wires for gas shielded arc welding have excellent crack resistance and low temperature toughness, but are more or less poor in bead appearance and shape, slag removal property and arc stability. These are the disadvantages of basic flux cored wires, compared with titania based flux cored wires. By way of example of conventional non-titania based flux cored wires, a barium fluoride based flux to which Mn, Si, Ni, etc. are added, is disclosed in the Japanese Patent Application Laid-Open Publication No. 62-166098. The barium fluoride based flux cored wire is excellent in low temperature toughness, but welding workability is poor and bead appearance and shape are inferior. With reference to the non-titania based flux cored wire presented in the Japanese Patent Application Laid-Open Publication No. 52-65736, a flux contains Ni, Cu and Mn and the welded structure is heat treated after welding so as to remove residual stress and improve low temperature toughness. However, there are limitations to the improvement of brittle fracture characteristics and low temperature toughness using.

In addition, conventional basic flux cored wires must use a mixed gas (75 to 80% Ar+20 to 25% $CO_2$) as a shield gas in order to secure arc stability and the transfer of metal droplets. Therefore, the basic flux cored wires have a limited applicability.

SUMMARY OF THE INVENTION

Therefore, the present invention has been made in view of the above problems, and it is an object of the present invention to provide a basic flux cored wire, which is excellent in crack resistance, low temperature toughness and weldability and can use an Ar/$CO_2$ mixed gas or 100% $CO_2$ as a shield gas.

In accordance with the present invention, the above object can be accomplished by the provision of a basic flux cored wire having a mild steel or an alloy steel sheath filled with flux, characterized in that the flux essentially comprise of, with respect to the total weight of the wire:

0.3 to 3.0% Ti and Ti oxide ($TiO_2$-converted value);
1.0 to 2.5% Si and Si oxide ($SiO_2$-converted value);
0.1 to 1.5% Mg and Mg oxide (MgO-converted value);
1.5 to 4.0% Mn and Mn oxide (MnO-converted value);
0.2 to 1.5% Al and Al oxide ($Al_2O_3$-converted value);
0.1 to 1.0% Zr and Zr oxide ($ZrO_2$-converted value);
0.2 to 3.5% $CaF_2$; and
0.01 to 0.5% $K_2O$, with the proviso that the components satisfy the basicity(B) of 0.5 to 4.5 in the basicity equation (1) defined as $B=(CaF_2+MgO+MnO+K_2O)/(TiO_2+SiO_2+Al_2O_3+ZrO_2)$.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
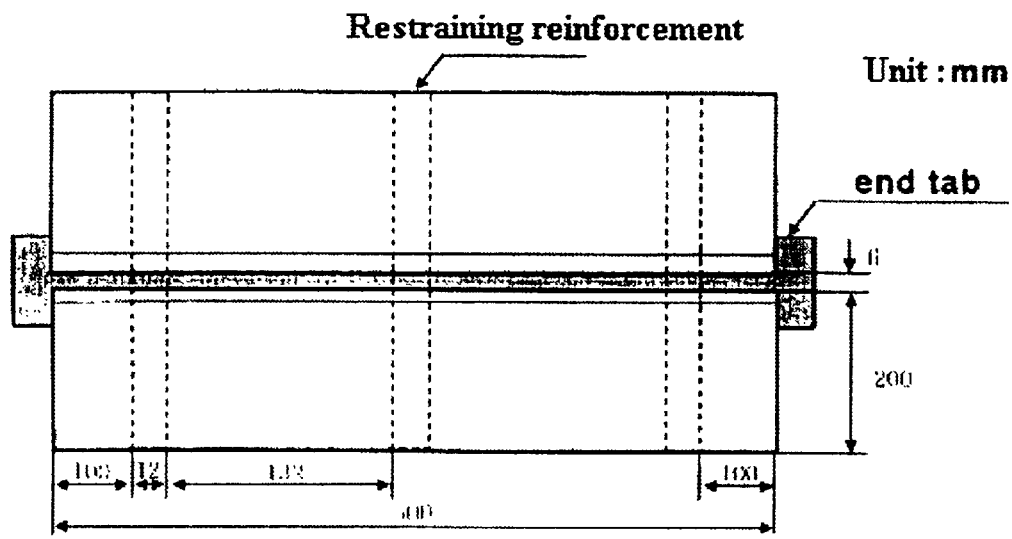
FIG. 1 is a plan view showing the condition of a restraint crack test.
Figure 2:
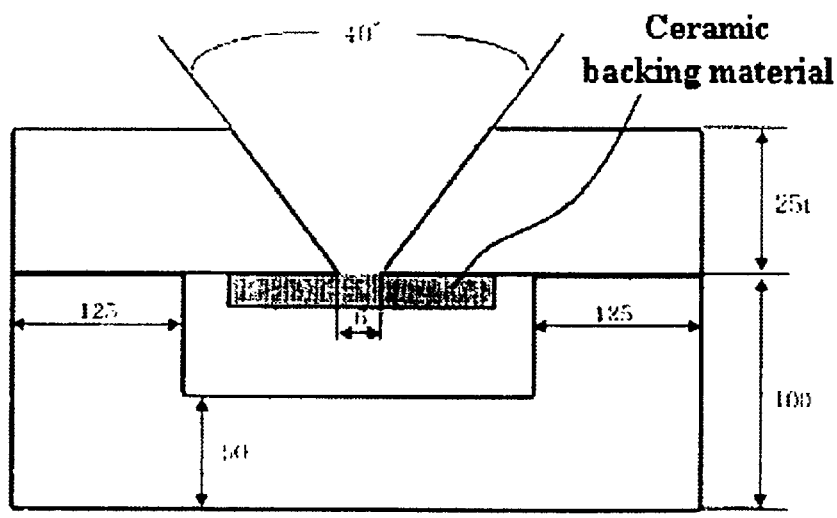
FIG. 2 is a cross sectional view of FIG. 1.

The following will specifically describe the reasons why, in the flux according to the present invention, each component is added and its composition ratio is limited.

$TiO_2$ acts as a slag forming agent and an arc stabilizer and it is an acidic flux component and is mainly derived from rutile, reduced ilmenite, etc. If the $TiO_2$ content is less than 0.3 wt %, the slag forming amount is small and running of molten metal is liable to occur in the upward vertical position welding. On the contrary, if the $TiO_2$ content exceeds 3.0 wt %, arc stability becomes worse and the amount of produced spatter is increased, thereby welding workability is lowered. Therefore, it is preferable to limit the added amount of Ti and Ti oxide ($TiO_2$-converted value) to a range of 0.3 to 3.0 wt %.

$SiO_2$ is an acidic flux component and acts to provide suitable viscosity of the fused slag and arc stability. If the $SiO_2$ content is less than 1.0 wt %, arc is unstable, the amount of produced spatter is increased and a slag covering property is deteriorated. On the contrary, if the $SiO_2$ content exceeds 2.5 wt %, slag is solidified and thus a slag removal property is deteriorated. Therefore, it is preferable to limit the added amount of Si and Si oxide ($SiO_2$-converted value) to a range of 1.0 to 2.5 wt %.

$Al_2O_3$ is an acidic flux component and acts to raise a slag solidifying point and make the metal droplets fine to thereby cause a spray arc transfer. If the $Al_2O_3$ content is less than 0.2 wt %, its effect is insufficient, while, if it exceeds 1.5 wt %, the shape of a bead becomes worse. Therefore, it is preferable to limit the added amount of Al and Al oxide ($Al_2O_3$-converted value) to a range of 0.2 to 1.5 wt %.

$ZrO_2$ is an acidic flux component and acts to raise a slag solidifying point and to provide arc stability. If the $ZrO_2$ content is less than 0.1 wt %, its effect is insufficient, while if it exceeds 1.0 wt %, arc is liable to be unstable and the amount of produced spatter is increased, thereby welding workability is deteriorated. Therefore, it is preferable to limit the added amount of Zr and Zr oxide ($ZrO_2$-converted value) to a range of 0.1 to 1.0 wt %.

$CaF_2$ is a basic flux component and acts as a slag forming agent to thereby make the appearance of a bead good. Furthermore, it generates a decomposition gas ($CO_2$) and thus improves a shielding ability. It must be added in an amount of more than 0.2 wt % to achieve these purposes. If the $CaF_2$ content exceeds 3.5 wt %, the amount of produced fumes and the amount of spatter increase and the appearance of a bead is poor due to decrease of viscosity of a deposited metal. Therefore, it is preferable to limit the added amount of $CaF_2$ to a range of 0.2 to 3.5 wt %.

MgO is a basic flux component and acts to raise a slag solidifying point. Furthermore, it acts as a deoxidizing agent and an arc stabilizing agent. If the MgO content is less than 0.1 wt %, its effect is insufficient, while if it exceeds 1.5 wt %, arc is unstable and the shape of a bead is poor. Therefore, it is preferable to limit the added amount of Mg and Mg oxide (MgO-converted value) to a range of 0.1 to 1.5 wt %.

MnO is a basic flux component and acts as a deoxidizing agent. Furthermore, it acts to improve the strength and toughness of a weld metal. If the MnO content is less than 1.5 wt %, its deoxidizing effect is insufficient, whereby welding defects in welded portions occur and the strength and toughness of a weld metal are lowered. On the contrary, if it exceeds 4.0 wt %, the strength of a weld metal increases, whereby cracks at high temperature are liable to occur and low temperature toughness is lowered. Therefore, it is preferable to limit the added amount of Mn and Mn oxide (MnO-converted value) to a range of 1.5 to 4.0 wt %.

$K_2O$ is a basic flux component and acts to lower the melting point of a slag to thereby make the fluidity of the slag good and improve arc stability. If the $K_2O$ content is less than 0.01 wt %, arc stability is insufficient and the appearance of a bead is poor. On the contrary, if it exceeds 0.5 wt %, the melting point of a slag is lowered upon welding; therefore, during upward vertical position welding, bead running readily occurs. Therefore, it is preferable to limit the added amount of $K_2O$ to a range of 0.01 to 0.5 wt %.

Hereinafter, the below equation (1) in which the above components must be satisfied, will be described.

$$B=(CaF_2+MgO+MnO+K_2O)/(TiO_2+SiO_2+Al_2O_3+ZrO_2) \quad \text{Equation (1)}$$

The equation (1) expresses the basicity of the flux components as a numerical formula. The B value must preferably satisfy a range of 0.5 to 4.5 in order to secure excellent crack resistance and low temperature toughness. If the B value is less than 0.5, crack resistance and low temperature toughness are deteriorated. In this case, the resultant flux is a titania based flux, rather than a basic flux. If the B value exceeds 4.5, welding workability is deteriorated, slag removal property is lowered and the shape of a bead is poor. Therefore, it is preferable to limit the B value to a range of 0.5 to 4.5.

In addition to the essential components, the flux of the present invention further comprises iron powder. The iron powder improves an arc stability and a deposition efficiency. Furthermore, the fluidity of a flux filled in a steel sheath is increased and thus the deflection of the flux is prevented during tubing and drawing a wire.

Meanwhile, no limitation is imposed on the shape of a flux filled in a wire. The surface of the wire may be coated with an oxidative film in order to improve conductivity and provide anticorrosion. The shape of the cross section of the wire is preferably circular but no limitation is imposed on the inner shape of the wire.

EXAMPLE

Hereinafter, the basic flux cored wires prepared according to the present invention will be specifically described with respect to physical properties and welding workability.

Various fluxes each was filled in a steel sheath (KS D 3512, SPCC) in a filling rate of 10 to 20 wt % based on the total weight of the wire, to prepare a flux cored wire with 1.2 mm diameter. The compositions of the fluxes are shown in Table 1.

The results of welding workability tests of the prepared wires in the horizontal fillet and upward vertical position are presented in Table 3 and Table 4. Table 2 describes the welding conditions for welding workability tests The tensile strength, yield strength and Charpy V-notched impact property of a deposited metal were accomplished according to the procedures of KS, AWS standard, and the evaluation results are presented in Table 5. The restraint crack tests of welded portions were accomplished under the condition of FIG. 1 and the results are presented in Table 5.

In detail, the restraint crack test were accomplished under the welding condition of welding current of 240 to 260 A and welding voltage of 32V, and a rolled steel for welding structure, SM 490 A steel plate 25 t was used as a test steel plate material.

TABLE 1

| Example | $TiO_2$ | $SiO_2$ | $ZrO_2$ | $Al_2O_3$ | $CaF_2$ | MgO | MnO | $K_2O$ | T-Fe | Others | Equation (1) |
|---|---|---|---|---|---|---|---|---|---|---|---|
| Inv. | | | | | | | | | | | |
| 1 | 0.41 | 2.01 | 0.21 | 0.53 | 2.58 | 0.59 | 3.27 | 0.03 | 4.41 | 0.96 | 2.05 |
| 2 | 2.49 | 1.82 | 0.37 | 0.77 | 1.47 | 0.17 | 2.67 | 0.08 | 4.40 | 0.76 | 0.81 |
| 3 | 0.48 | 1.24 | 0.19 | 0.31 | 2.57 | 1.42 | 3.21 | 0.29 | 4.49 | 0.80 | 3.37 |
| 4 | 1.92 | 1.13 | 0.16 | 1.04 | 3.40 | 1.38 | 3.87 | 0.42 | 1.11 | 0.57 | 2.13 |
| 5 | 2.81 | 2.42 | 0.21 | 1.27 | 0.26 | 1.27 | 3.79 | 0.37 | 2.17 | 0.43 | 0.85 |
| 6 | 1.57 | 2.27 | 0.89 | 0.97 | 3.01 | 1.42 | 1.97 | 0.19 | 2.00 | 0.71 | 1.16 |
| 7 | 0.42 | 1.21 | 0.17 | 0.31 | 3.34 | 1.35 | 3.75 | 0.42 | 3.12 | 0.91 | 4.20 |
| Comp. | | | | | | | | | | | |
| 8 | 0.27 | 0.69 | 0.16 | 0.67 | 0.62 | 1.41 | 3.59 | 0.62 | 6.02 | 0.95 | 3.49 |
| 9 | 0.57 | 2.04 | 0.38 | 0.92 | 0.35 | 0.07 | 3.89 | 0.47 | 5.39 | 0.92 | 1.22 |
| 10 | 0.92 | 1.89 | 0.55 | 1.23 | 1.09 | 0.92 | 1.35 | 0.15 | 5.97 | 0.93 | 0.76 |
| 11 | 1.28 | 2.11 | 0.72 | 0.67 | 3.62 | 1.78 | 2.84 | 0.29 | 1.07 | 0.62 | 1.78 |
| 12 | 1.49 | 1.16 | 0.21 | 0.12 | 2.67 | 0.52 | 3.84 | 0.46 | 3.94 | 0.59 | 2.51 |
| 13 | 2.54 | 1.53 | 0.06 | 0.87 | 2.19 | 1.38 | 3.41 | 0.09 | 2.45 | 0.48 | 1.41 |
| 14 | 0.48 | 0.89 | 1.02 | 0.42 | 1.67 | 1.35 | 3.05 | 0.34 | 5.00 | 0.78 | 2.28 |
| 15 | 3.11 | 1.32 | 0.24 | 0.71 | 3.28 | 1.16 | 4.07 | 0.39 | 0.58 | 0.14 | 1.65 |
| 16 | 2.84 | 2.32 | 0.82 | 1.43 | 0.41 | 0.17 | 1.72 | 0.21 | 4.26 | 0.82 | 0.34 |
| 17 | 0.34 | 1.13 | 0.15 | 0.31 | 3.39 | 1.41 | 3.68 | 0.42 | 3.36 | 0.81 | 4.61 |

1) T-Fe: the total sum of Fe powder in flux except for the Fe in a steel sheath
2) Others: trace elements such as C, NaF, etc. and impurities

TABLE 2

| Section | Welding condition |
|---|---|
| Steel plate | KS D 3515 SM 490A |
| Steel plate thickness | 12 mm(t) |
| Welding polarity | DC+ |
| Shield gas | 100% $CO_2$ |

TABLE 2-continued

| Shield gas flow rate | 20 l/min | |
|---|---|---|
| Welding position | Horizontal fillet position | Upward vertical position |
| Welding current | 280–300 A | 200–220 A |
| Welding voltage | 33–34 V | 29–30 V |
| Welding speed | 35 cm/min | 12–17 cm/min |
| Distance between Tip and steel | 20 mm | 15 mm |

TABLE 3

Horizontal fillet position welding

| Example | Shape of bead | Stability of arc | Fluidity of slag | Removal property of slag | Amount of produced spatter |
|---|---|---|---|---|---|
| Inventive | | | | | |
| 1 | ○ | ○ | ⊚ | ○ | ⊚ |
| 2 | ⊚ | ⊚ | ○ | ○ | ⊚ |
| 3 | ○ | ○ | ⊚ | ⊚ | ⊚ |
| 4 | ⊚ | ⊚ | ⊚ | ⊚ | ○ |
| 5 | ⊚ | ⊚ | ○ | ○ | ⊚ |
| 6 | ⊚ | ⊚ | ○ | ⊚ | ○ |
| 7 | ○ | ○ | ⊚ | ⊚ | ○ |
| Comparative | | | | | |
| 8 | △ | △ | X | X | ○ |
| 9 | X | X | △ | ○ | ○ |
| 10 | △ | ○ | ○ | X | ○ |
| 11 | X | △ | △ | ○ | X |
| 12 | △ | X | △ | X | ○ |
| 13 | △ | △ | X | △ | △ |
| 14 | ○ | X | △ | ○ | X |
| 15 | X | ○ | △ | △ | △ |
| 16 | X | ○ | △ | ○ | △ |
| 17 | X | X | △ | X | X |

The evaluation of welding workability is as follows: ⊚: very good, ○: good, △: average, X: poor

TABLE 4

Upward vertical position welding

| Example | Shape of bead | Stability of arc | Fluidity of slag | Removal property of slag | Amount of produced spatter |
|---|---|---|---|---|---|
| Inventive | | | | | |
| 1 | ○ | ○ | ⊚ | ⊚ | ⊚ |
| 2 | ⊚ | ⊚ | ○ | ○ | ⊚ |
| 3 | ○ | ○ | ⊚ | ⊚ | ⊚ |
| 4 | ⊚ | ○ | ⊚ | ⊚ | ○ |
| 5 | ⊚ | ⊚ | ○ | ⊚ | ⊚ |
| 6 | ⊚ | ⊚ | ⊚ | ⊚ | ○ |
| 7 | ○ | ○ | ⊚ | ⊚ | ○ |
| Comparative | | | | | |
| 8 | △ | △ | X | X | ○ |
| 9 | X | X | △ | ○ | ○ |
| 10 | △ | ○ | △ | X | ○ |
| 11 | X | △ | △ | ○ | X |
| 12 | △ | X | △ | X | ○ |
| 13 | △ | △ | X | △ | △ |
| 14 | ○ | X | △ | ○ | X |
| 15 | △ | ○ | △ | X | △ |
| 16 | X | ⊚ | X | ○ | ○ |
| 17 | X | X | △ | X | X |

The evaluation of welding workability is as follows: ⊚: very good, ○: good, △: average, X: poor

TABLE 5

Results of mechanical and physical properties tests

| Example | Tensile strength | Yield strength | Charpy impact | Restraint crack |
|---|---|---|---|---|
| Inventive | | | | |
| 1 | Pass | Pass | Pass | ⊚ |
| 2 | Pass | Pass | Pass | ⊚ |
| 3 | Pass | Pass | Pass | ⊚ |
| 4 | Pass | Pass | Pass | ○ |
| 5 | Pass | Pass | Pass | ○ |
| 6 | Pass | Pass | Pass | ⊚ |
| 7 | Pass | Pass | Pass | ○ |
| Comparative | | | | |
| 8 | Pass | Pass | Pass | X |
| 9 | Pass | Pass | Pass | X |
| 10 | Failure | Failure | Failure | ⊚ |
| 11 | Failure | Failure | Failure | ○ |
| 12 | Pass | Pass | Pass | X |
| 13 | Pass | Pass | Failure | △ |
| 14 | Failure | Failure | Failure | ○ |
| 15 | Pass | Pass | Pass | X |
| 16 | Failure | Failure | Pass | ⊚ |
| 17 | Pass | Pass | Pass | X |

The evaluation of restraint crack test is as follows: ⊚: 0% cracks, ○: 1–5% cracks, △: 5–10% cracks, X: more than 10% cracks The results of welding workability and mechanical and physical properties tests of inventive examples are presented in Table 3 to Table 5 above.

The wires of examples 1–7, in which the composition and proportion of their flux components were within the scope of the present invention, exhibited Pass welding workability both in the horizontal fillet position and the upward vertical position. Also, they satisfied the KS, AWS standard in the tensile strength, yield strength and Charpy impact tests, and exhibited excellent restraint crack resistance and excellent welding workability under 100% $CO_2$ shielding.

On the other hand, in case of the wires of comparative examples 8–17, one or two of their flux components was/were outside the composition and proportion range(s) or the basicity(B) was not satisfied with scope defined in the present invention. For this reason, welding workability was poor or mechanical and physical properties did not satisfy the standard. Furthermore, a large number of cracks occurred in the restraint crack test and crack resistance was poor.

In the wire of comparative example 8, arc stability and slag removal property were poor and crack resistance in the restraint crack test was very poor because the $TiO_2$, $SiO_2$ and $K_2O$ contents were outside the ranges defined in the present invention.

In the wire of comparative example 9, arc stability and the shape of a bead were poor and crack resistance was poor because the MgO content was less than 0.10%.

In the wire of comparative example 10, slag removal property was poor and mechanical and physical properties did not satisfy the standard because the MnO content was less than 1.5%.

In the wire of comparative example 11, whole welding workability was poor, for example, the shape of a bead was poor and the amount of produced spatter was increased because the MgO and $CaF_2$ contents exceeded 1.5% and 3.5% respectively.

In the wire of comparative example 12, arc stability and slag removal property were poor and crack resistance was inferior because the $Al_2O_3$ content was outside the range defined in the present invention.

In the wire of comparative example 13, slag fluidity and slag removal property were poor. In mechanical and physical properties tests, tensile strength and yield strength satisfied the standard but Charpy impact property did not satisfy the standard. This is because the $ZrO_2$ content was less than 0.1%.

In the wire of comparative example 14, arc stability and slag fluidity were poor, in particular, the amount of produced spatter was increased in the upward vertical position welding, and mechanical and physical properties did not satisfy the standard because the $SiO_2$ and $ZrO_2$ contents were outside the ranges defined in the present invention.

In the wire of comparative example 15, slag removal property was poor and the shape of a bead was poor. Although mechanical and physical properties satisfied respective upper limits of the standard, crack resistance was poor. This is because the MnO and $TiO_2$ contents exceeded the upper limits defined in the present invention.

In the wire of comparative example 16, slag fluidity was poor, the shape of a bead was poor and mechanical and physical properties did not satisfy the standard because the basicity of the equation (1) was less than 0.5.

In the wire of comparative example 17, whole welding workability was poor and crack resistance was poor because the basicity of the equation (1) exceeded the upper limit proposed in the present invention.

As described in the above, the basic flux cored wires in accordance with the present invention, when optimizing the chemical components and their proportion of the flux, are excellent in crack resistance and low temperature toughness, and exhibit Pass welding workability in all welding positions, ensuring an improvement in the efficiency of welding work.

Conventional basic flux cored wires mainly use a mixed gas (75 to 80% Ar+20 to 25% $CO_2$) as a shield gas; on the other hand, the basic flux cored wire according to the present invention exhibits excellent weldability even under a shield gas of 100% $CO_2$.

The basic flux cored wires in accordance with the present invention exhibit excellent welding workability and the shape of a bead in all welding positions such as the downward, horizontal fillet and upward vertical welding positions, compared with conventional basic flux cored wires with welding workabilities worse than titania based flux cored wires.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A basic flux cored wire having a mild steel or an alloy steel sheath filled with flux, characterized in that the flux essentially comprise of, with respect to the total weight of the wire:

0.3 to 3.0% Ti and Ti oxide ($TiO_2$-converted value);

1.0 to 2.5% Si and Si oxide ($SiO_2$-converted value);

0.1 to 1.5% Mg and Mg oxide (MgO-converted value);

1.5 to 4.0% Mn and Mn oxide (MnO-converted value);

0.2 to 1.5% Al and Al oxide ($Al_2O_3$-converted value);

0.1 to 1.0% Zr and Zr oxide ($ZrO_2$-converted value);

0.2 to 3.5% $CaF_2$; and 0.01 to 0.5% $K_2O$, with the proviso that the components satisfy the basicity(B) of 0.5 to 4.5 in the basicity equation (1) defined as $B=(CaF_2+MgO+MnO+K_2O)/(TiO_2+SiO_2+Al_2O_3+ZrO_2)$.

* * * * *